(12) United States Patent
Liu (10) Patent No.: US 7,424,941 B2
(45) Date of Patent: Sep. 16, 2008

(54) CLUTCH DEVICE WITH BUFFER FUNCTION

(76) Inventor: Jen-Chih Liu, 235 Chung - Ho Box 8-24, Taipei (TW)

( * ) Notice: Subject to any disclaimer, the term of this patent is extended or adjusted under 35 U.S.C. 154(b) by 360 days.

(21) Appl. No.: 11/385,607

(22) Filed: Mar. 22, 2006

(65) Prior Publication Data
US 2007/0221464 A1    Sep. 27, 2007

(51) Int. Cl.
*F16D 11/04*    (2006.01)
(52) U.S. Cl. .................. 192/69.7; 192/69.8; 192/69.82
(58) Field of Classification Search ................ 192/69.7, 192/69.8, 69.82, 52.6, 109 A
See application file for complete search history.

(56) References Cited
U.S. PATENT DOCUMENTS
1,345,633 A  *  7/1920  Pyle .......................... 192/69.8
6,557,683 B2 *  5/2003  Geremia et al. ............ 192/69.7
2005/0133331 A1 *  6/2005  Howard .................... 192/69.82
2005/0150735 A1 *  7/2005  Donner ...................... 192/48.6

* cited by examiner

*Primary Examiner*—Roger Pang (57) ABSTRACT

A clutch device with a buffer function comprises a first spindle having an engaging surface; a second spindle having a rack at a side near the first spindle; the second spindle movably engaged to the first spindle; a clutch sleeve enclosing the second spindle; a front side of the clutch sleeve formed with an engaging surface near the first spindle; an axial hole of the clutch sleeve being formed as a teethed groove which can be positioned by engagement and is axially moved; the clutch sleeve being driven by a clutch toggle; the clutch toggle being controllable through a driving fork; a buffer unit installed between the clutch toggle and the clutch sleeve; thereby the movement of the clutch toggle will drive the clutch sleeve to move.

13 Claims, 14 Drawing Sheets

CLUTCH DEVICE WITH BUFFER FUNCTION

FIELD OF THE INVENTION

The present invention relates to clutches, and in particular to a clutch device with a buffer function.

BACKGROUND OF THE INVENTION

Clutches are generally used in the prior art as a transfer mechanism of a vehicle. In U.S. Pat. No. 5,997,428, a clutch for a two-wheel vehicle and four-wheel vehicle is disclosed. A driving fork is installed between two rotary shafts for clutching the mechanism between two shafts. The prior art resolves the problem of the non-alignment as one shaft is desired to engage with another shaft. However due to the imperfect in design and space configuration, the structure is very complicated. An external space is used to install a buffer device. The structure is very complicated, the volume is great and the cost is high. Furthermore, the assembly work is tedious and time-consumed. The prior art design is uneconomic.

SUMMARY OF THE INVENTION

Accordingly, the primary object of the present invention is to provide a clutch device with a buffer function which comprises a first spindle having an engaging surface; a second spindle having a rack at a side near the first spindle; the second spindle movably engaged to the first spindle; a clutch sleeve enclosing the second spindle; a front side of the clutch sleeve formed with an engaging surface near the first spindle; an axial hole of the clutch sleeve being formed as a teethed groove which can be positioned by engagement and is axially moved; the clutch sleeve being driven by a clutch toggle; the clutch toggle being controllable through a driving fork; a buffer unit installed between the clutch toggle and the clutch sleeve; thereby the movement of the clutch toggle will drive the clutch sleeve to move. If the surface of the clutch toggle of the second spindle is not aligned to the surface of the first spindle. The resisting force in the alignment and the pushing force of the driving fork will be absorbed by the compression of the spring between the buffer spring sleeve and the buffer ring. Thereby in the engagement of the surface of the clutch toggle of the second spindle and the surface of the first spindle, the two surfaces will be aligned and engaged so as to protect the parts of the clutch mechanism.

The various objects and advantages of the present invention will be more readily understood from the following detailed description when read in conjunction with the appended drawing.

DETAILED DESCRIPTION OF THE INVENTION

Figure 1:
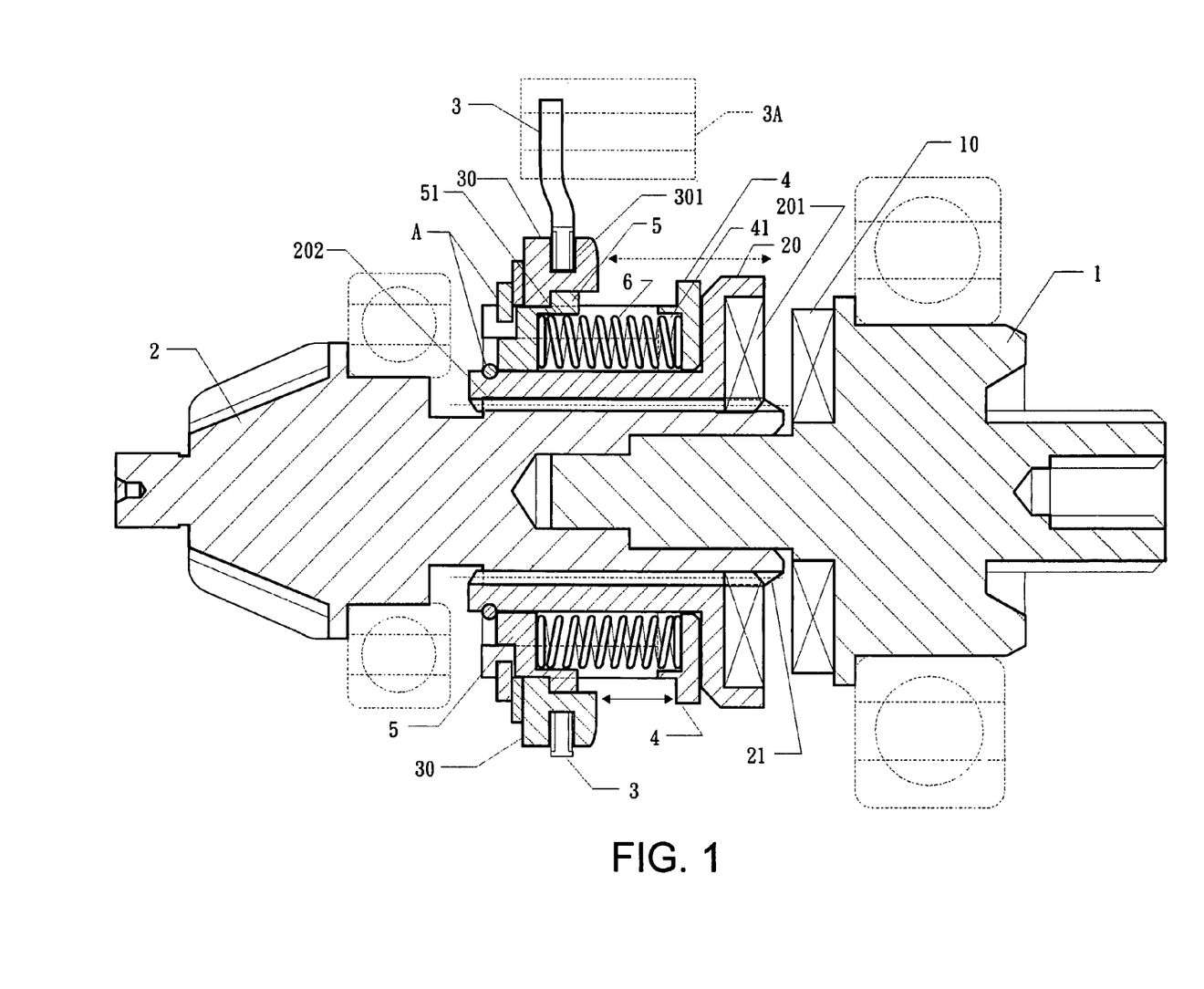
FIG. 1 is one embodiment of the clutch device of the present invention.
Figure 2:
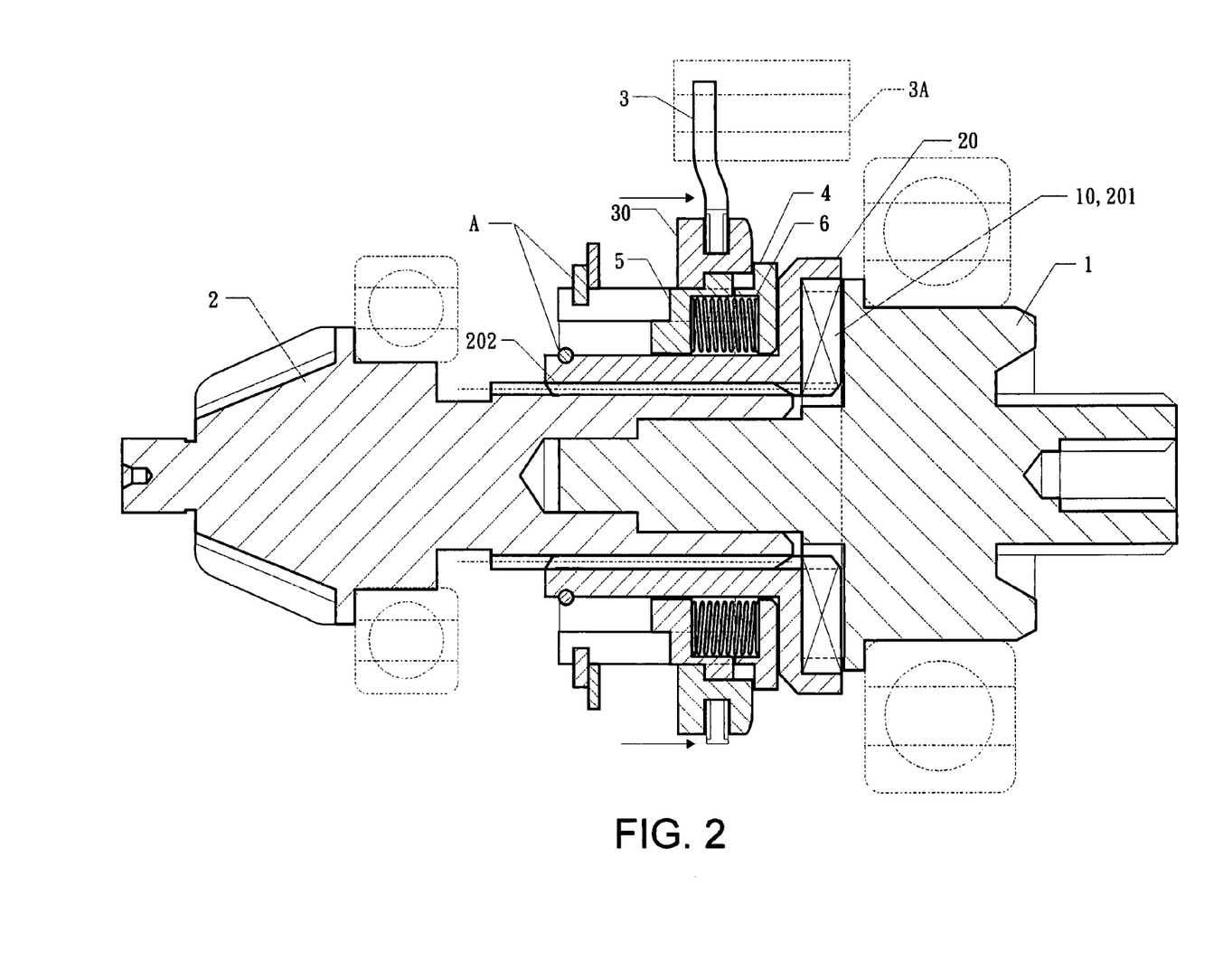
FIG. 2 is a schematic view about the embodiment of the driving of the clutch device of the present invention.
Figure 3:
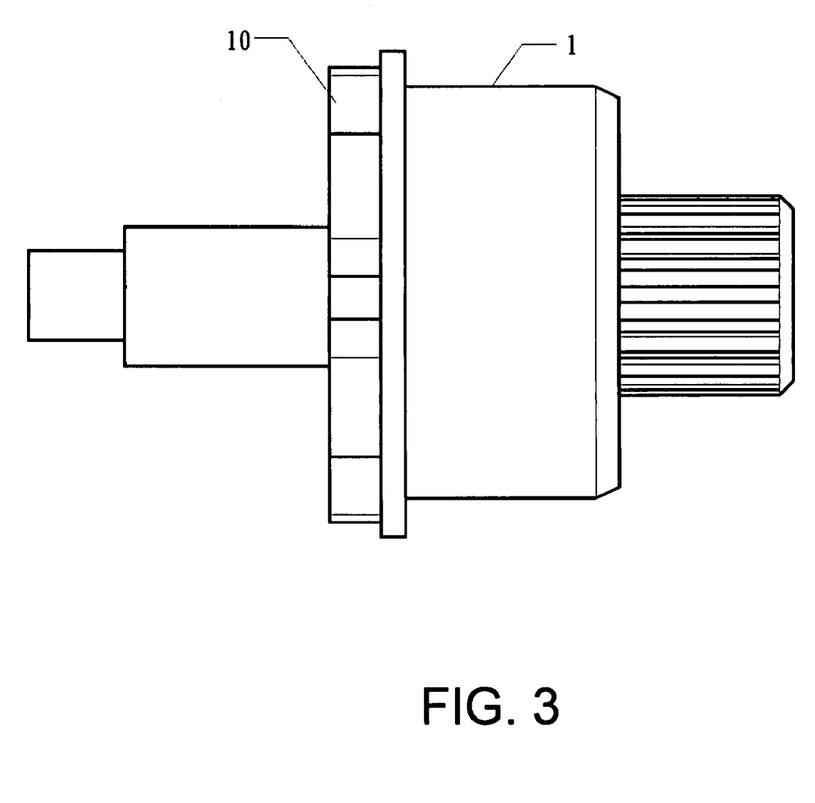
FIG. 3 is a schematic view about the embodiment of the first spindle of the clutch device of the present invention.
Figure 4:
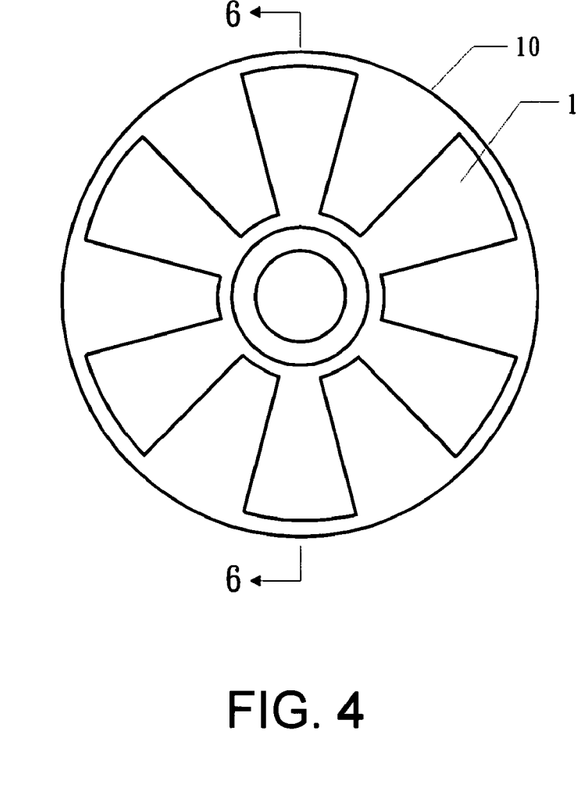
FIG. 4 is a left view of the FIG. 3.
Figure 5:
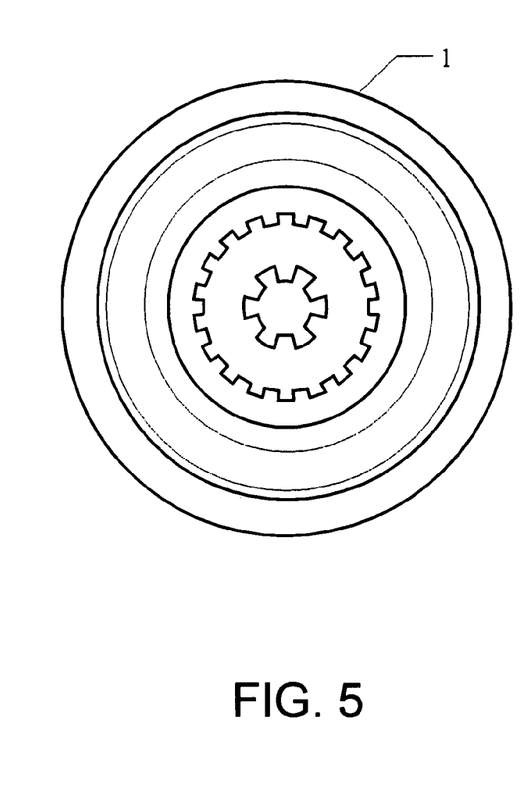
FIG. 5 is a right view of the FIG. 3.
Figure 6:
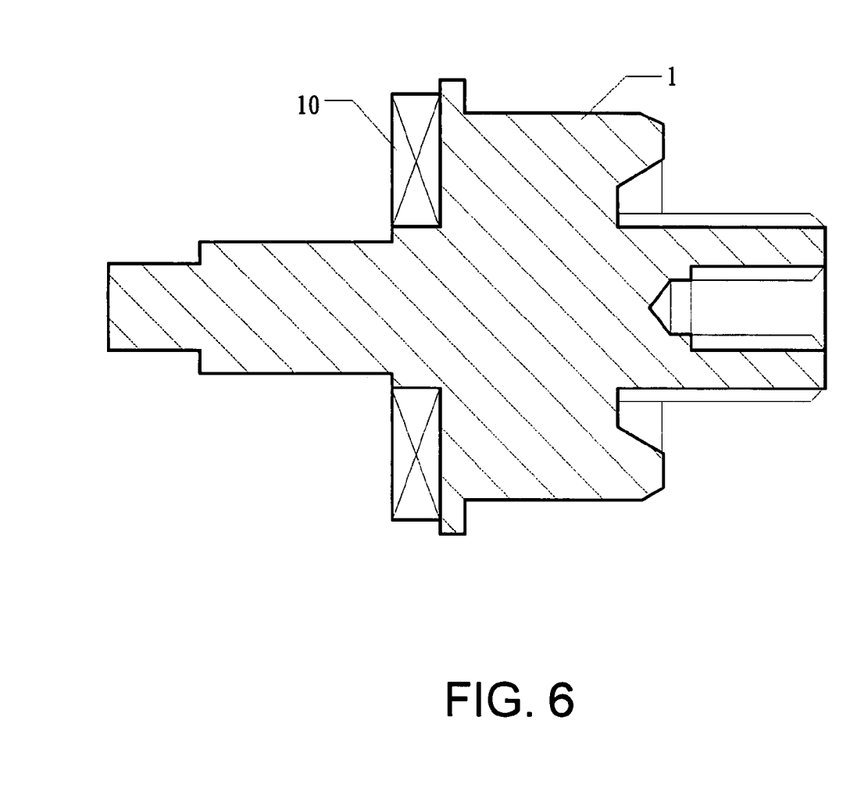
FIG. 6 is a schematic view along line 6-6 of FIG. 4.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims. Referring to FIGS. 1 and 2, the bufferable clutch device of the present invention is illustrated. The present invention has the following elements.

A first spindle 1 has an engaging surface 10

A second spindle 2 has a rack 21 at a side near the first spindle 1. The second spindle 2 is movably engaged to the first spindle 1. A clutch sleeve 20 encloses the second spindle 2. A front side of the clutch sleeve 20 is formed with an engaging surface 201 near the first spindle 1. An axial hole of the clutch sleeve 20 is formed as a teethed groove 202 which can be positioned by engagement and is axially moved. The clutch sleeve 20 is driven by a clutch toggle 30. The clutch toggle 30 is controllable through a driving fork 3.

A buffer unit is installed between the clutch toggle 30 and the clutch sleeve 20. The buffer unit includes a buffer spring sleeve 4 and a buffer ring 5. Thereby the movement of the clutch toggle 30 will drive the clutch sleeve 20 to move.

Figure 24:
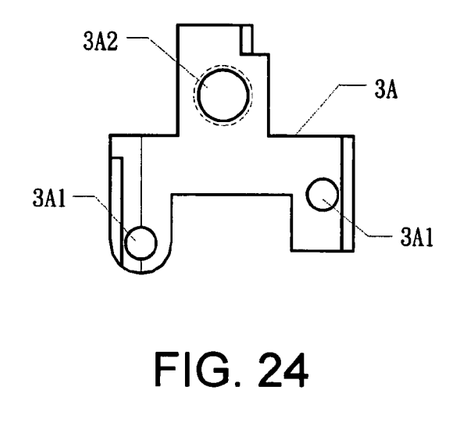
FIG. 24 shows the operation of the present invention, where a driving fork is used to drive a driving block.
Figure 25:
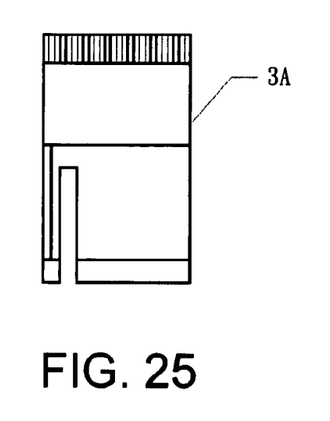
FIG. 25 is a right view of FIG. 24.
Figure 26:
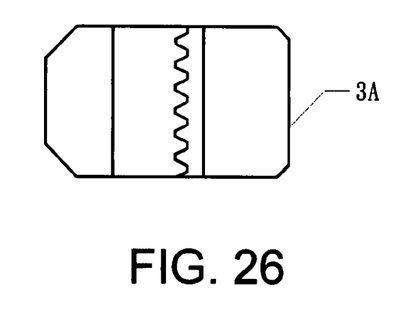
FIG. 26 is an elevational view of FIG. 24.

A driving block 3A drives the driving fork 3. As shown in FIGS. 24 to 26, the driving block 3A has at least one penetrating hole 3A1 for installing shaft which serves to position the driving block 3A so as to assembly the driving block 3A and the clutch mechanism. Moreover the driving block 3A has a penetrating screw hole 3A2 for driving a screw rod which serves to drive the driving block 3A. The screw rod rotates bidirectionally by electrical force or non-electrical force. Thereby the effects of displacement of driving block 3A and driving of the clutch toggle 30 by using the driving fork 3 are achieved.

Figure 7:
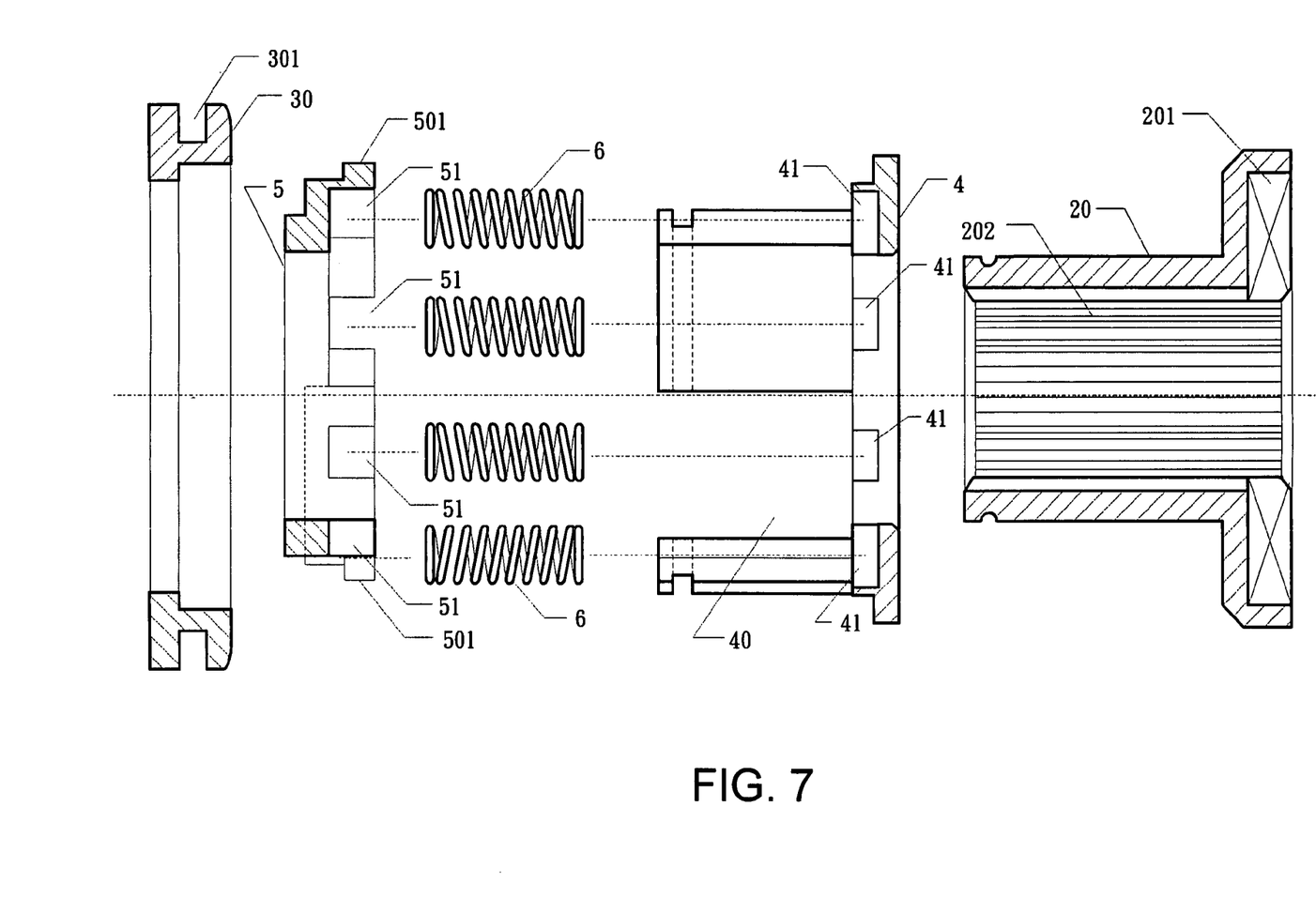
FIG. 7 shows the assembly of the clutch sleeve of the second spindle, the clutch toggle, the buffer spring sleeve, the buffer ring, and the springs.
Figure 8:
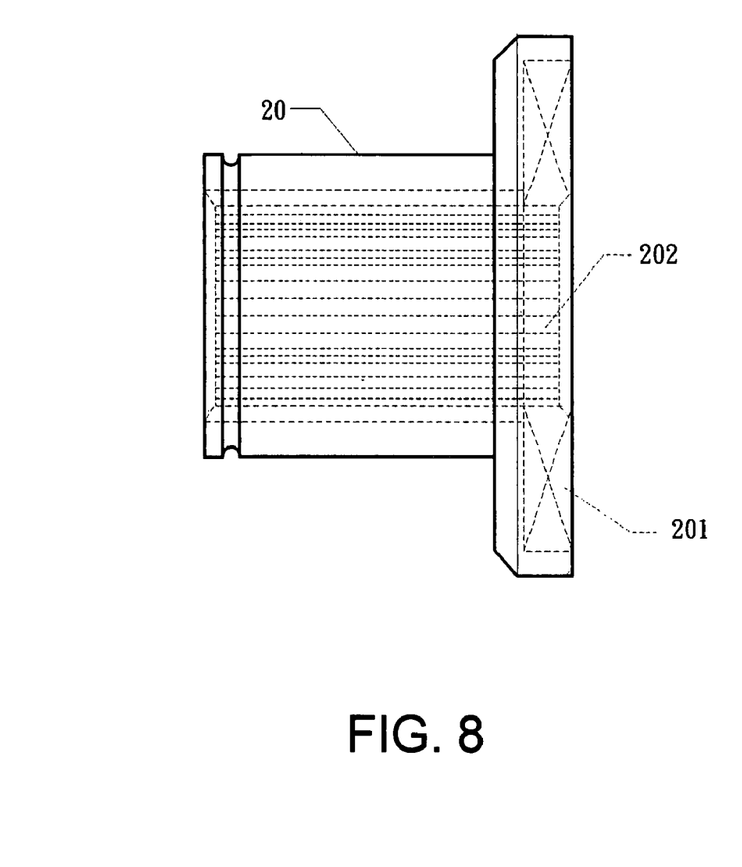
FIG. 8 shows the clutch sleeve of the present invention.
Figure 9:
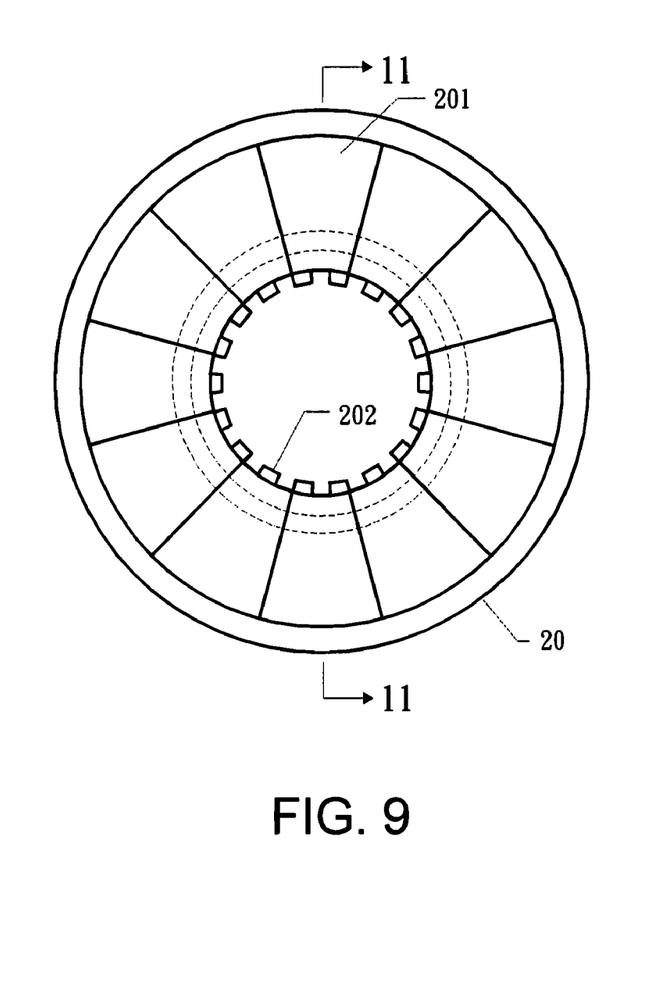
FIG. 9 is a right view of FIG. 8.
Figure 10:
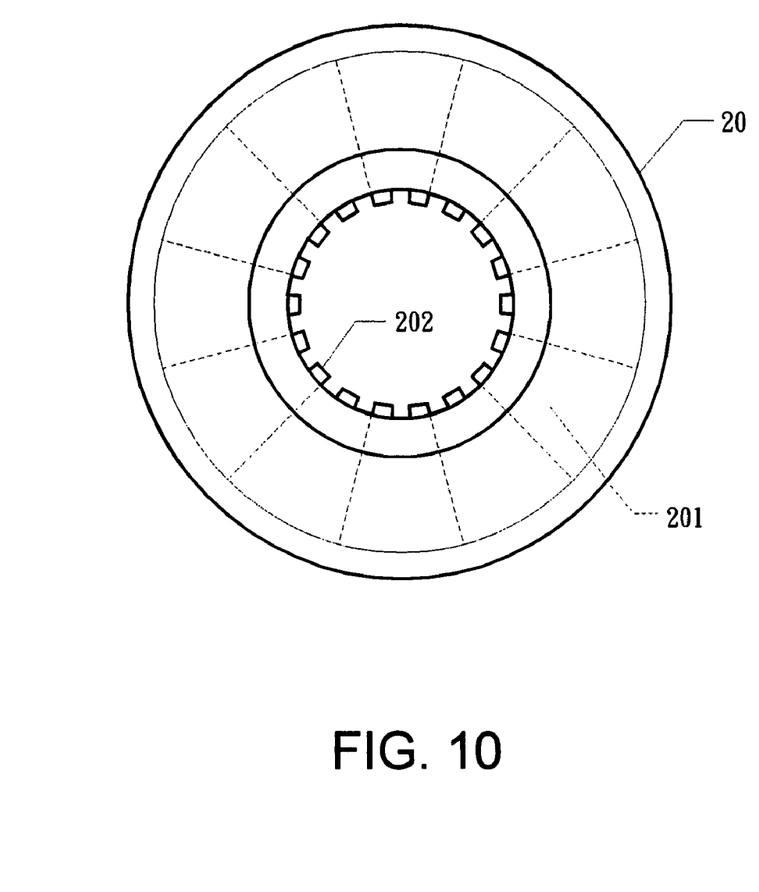
FIG. 10 is a left view of FIG. 8.
Figure 11:
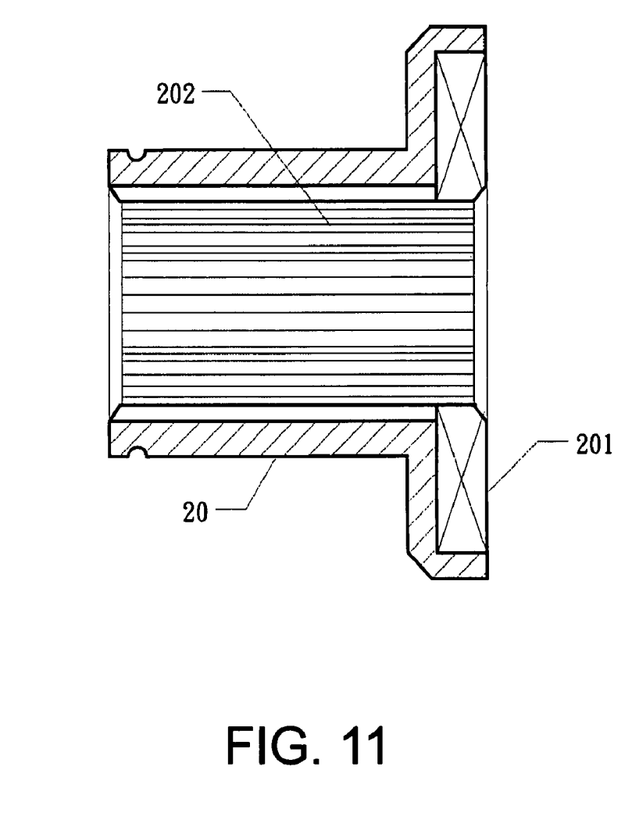
FIG. 11 is a schematic view along the line 11-11 of FIG. 9.
Figure 12:
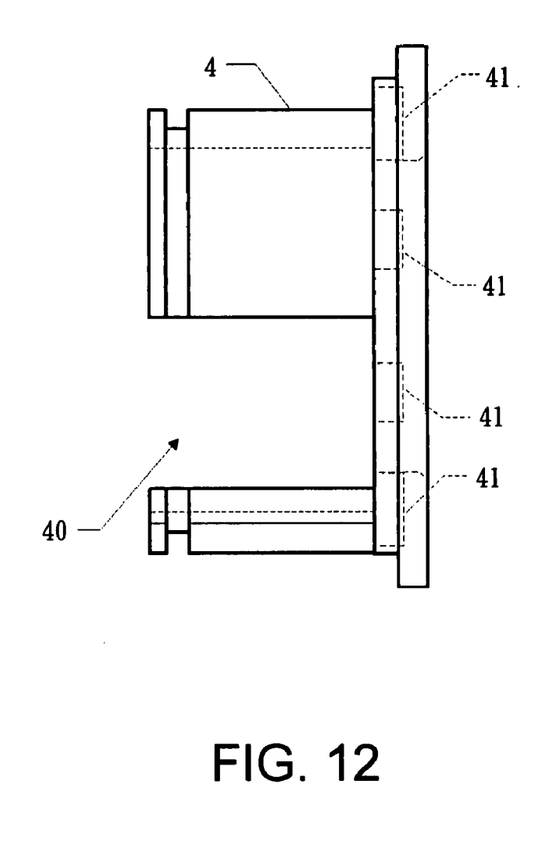
FIG. 12 shows the buffer spring sleeve of the present invention.
Figure 13:
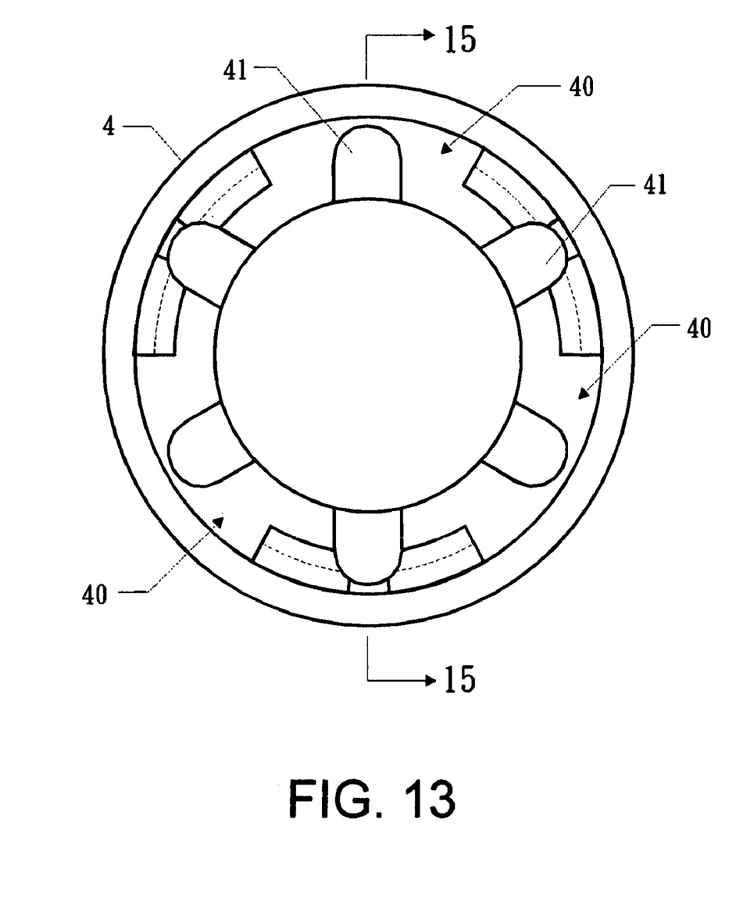
FIG. 13 is a left view of FIG. 12.
Figure 14:
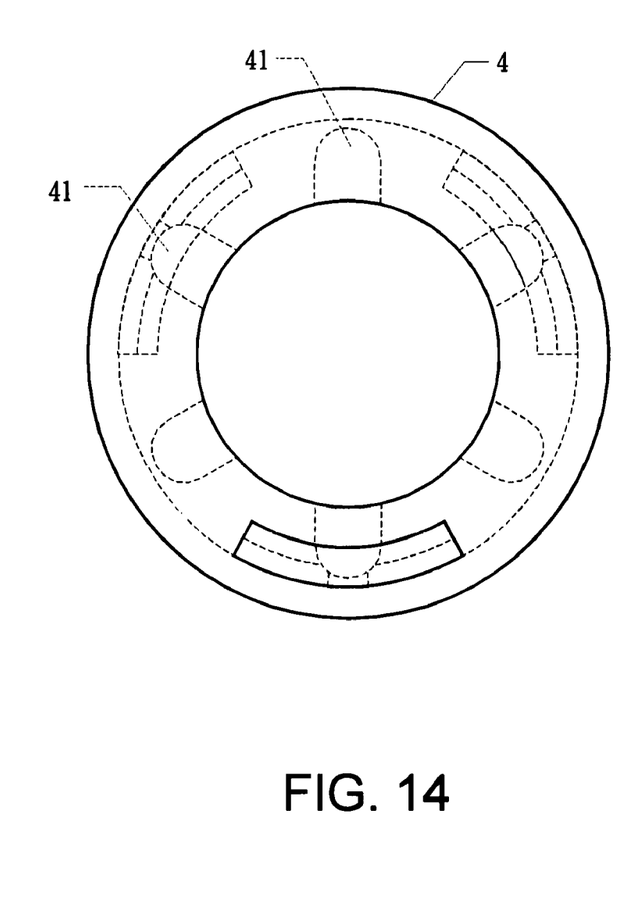
FIG. 14 is a right view of FIG. 12.
Figure 15:
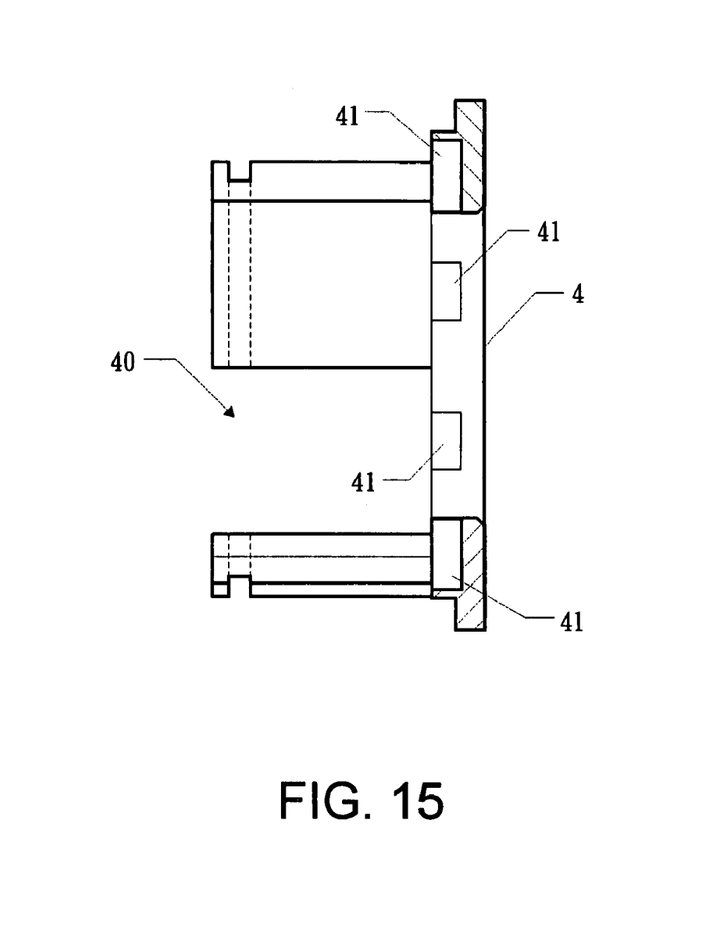
FIG. 15 is a schematic view along line 15-15 of FIG. 13.
Figure 16:
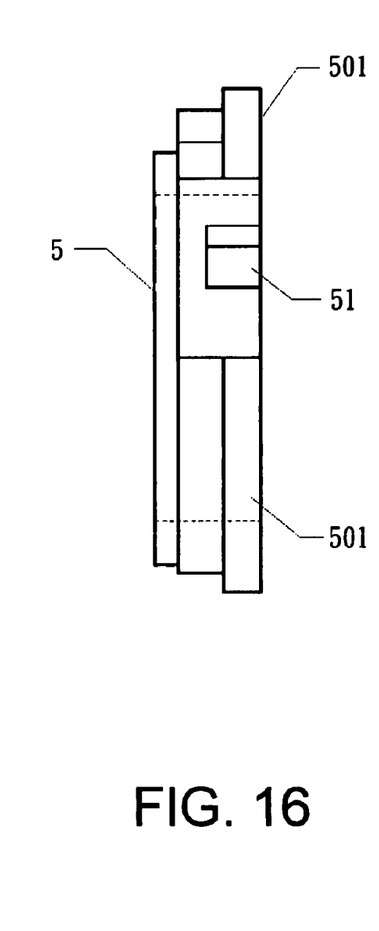
FIG. 16 shows the buffer ring of the present invention.
Figure 17:
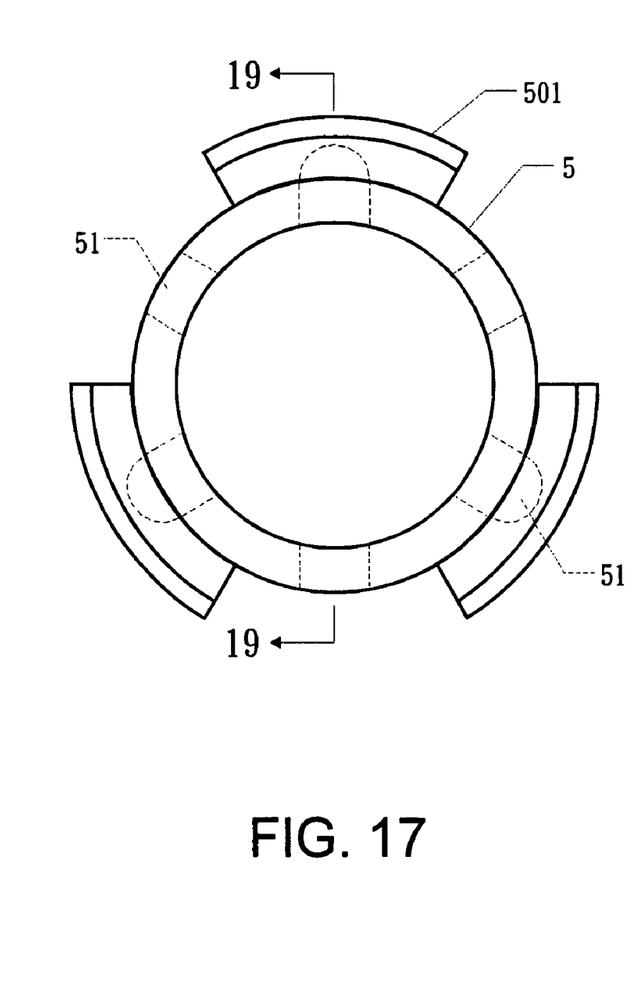
FIG. 17 shows the left view of FIG. 16.
Figure 18:
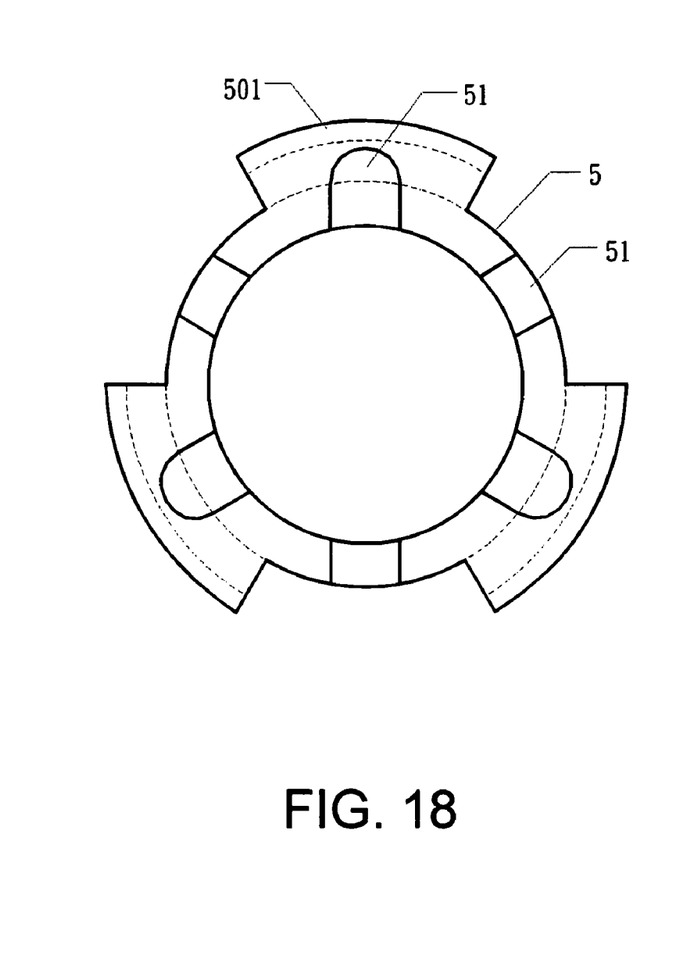
FIG. 18 shows the right view of FIG. 16.
Figure 19:
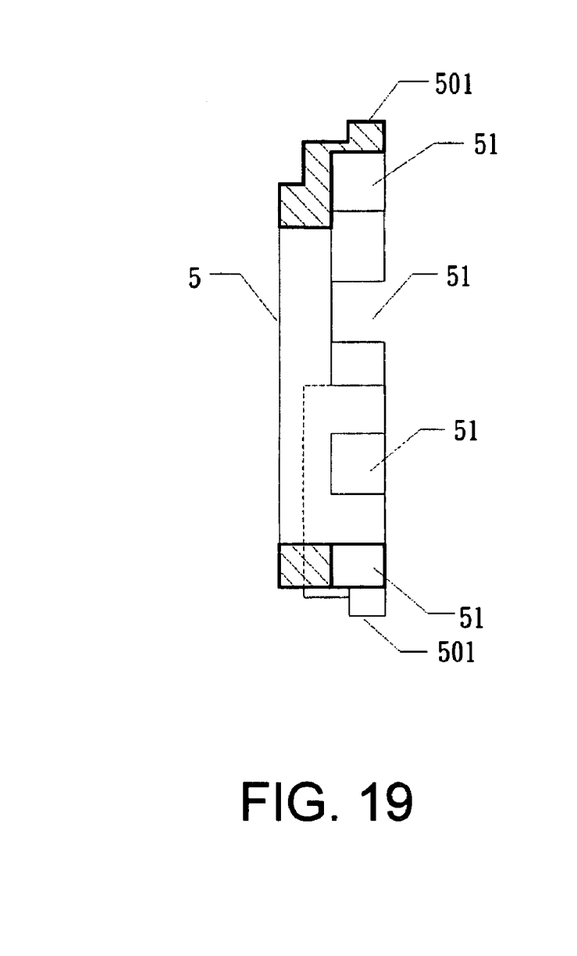
FIG. 19 shows the cross sectional view along line 19-19 of FIG. 17.
Figure 20:
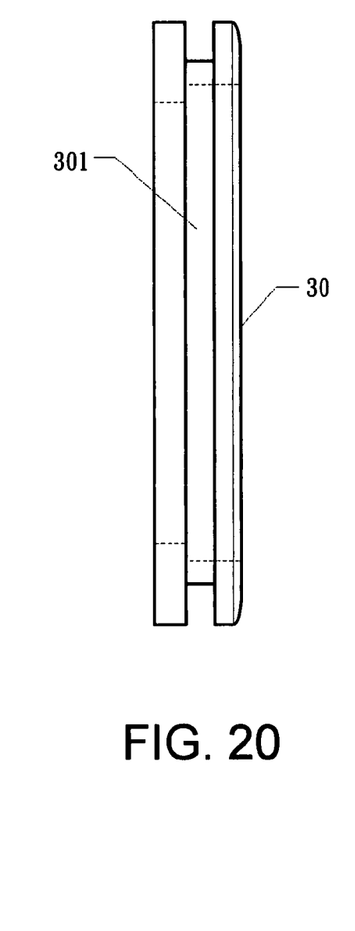
FIG. 20 shows the clutch toggle of the present invention.
Figure 21:
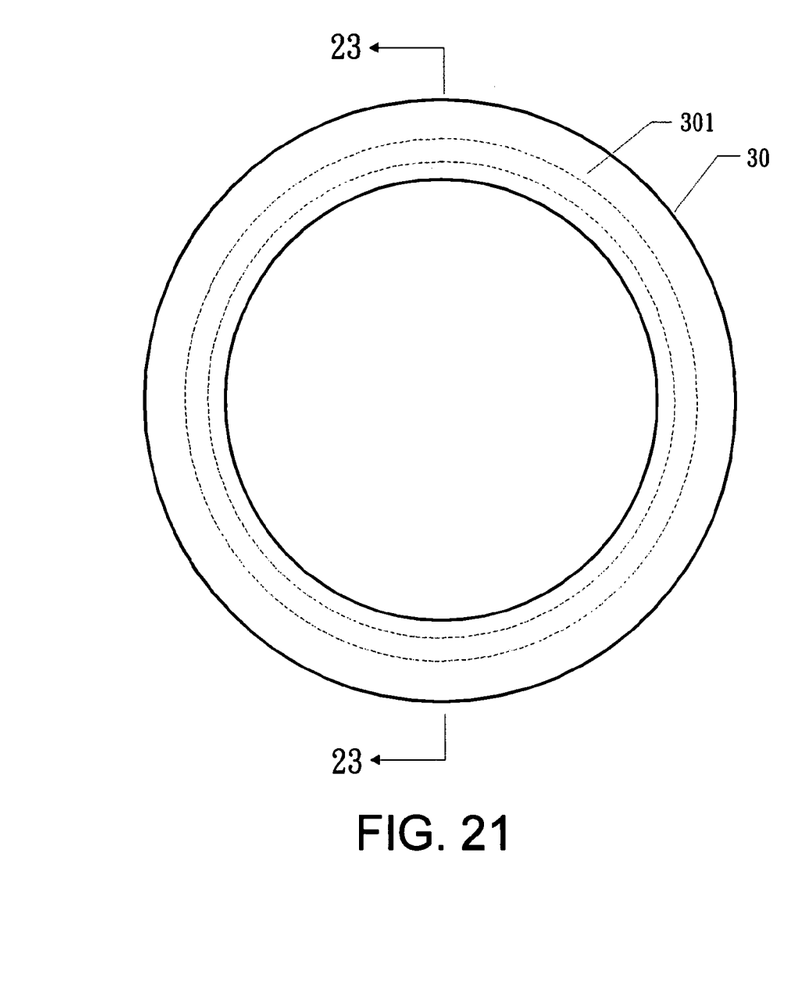
FIG. 21 is a left view of FIG. 20.
Figure 22:
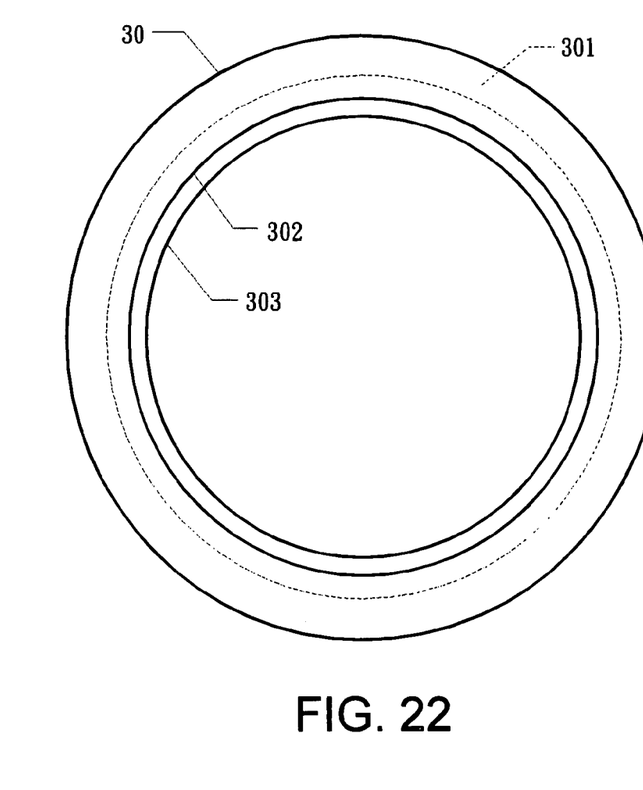
FIG. 22 is a right view of FIG. 20.
Figure 23:
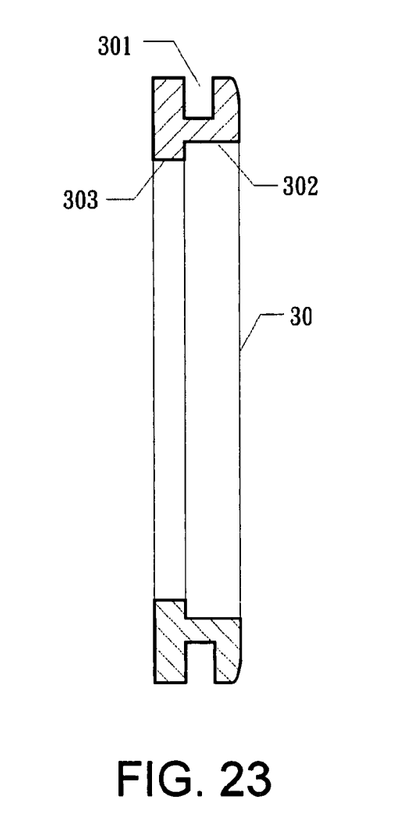
FIG. 23 is a cross sectional view along line 23-23 of the present invention.

Referring to FIGS. 7, 20, and 22, the clutch toggle 30 encloses a buffer ring 5. An outer side of the clutch toggle 30 has an annular recess 301 for assembling the driving fork 3. An inner side of the clutch toggle 30 is formed as a stepped surface with two different diameters. An inner diameter of a front inner surface is great than that of the rear inner surface 303.

Referring to FIGS. 1, 2, 12 to 15, the buffer spring sleeve 4 is firmly secured at an outer side of the clutch sleeve 20. A C ring is embedded into an outer side of the clutch sleeve 20 for fixing the buffer spring sleeve 4 at the outer side of the clutch sleeve 20. The buffer spring sleeve 4 has an opening 40. The buffer ring 5 is axially moveable in the opening. A front end of the buffer spring sleeve 4 has a plurality of spring positioning recess 41 for receiving one ends of a plurality of springs 6.

Referring to FIGS. 16 to 19, a front end of the buffer ring 5 has a pushing wall 501 at an outer side of the buffer ring 5. An outer diameter of the pushing wall 501 is slightly greater than an inner diameter of an inner surface 303 at a rear end of the clutch toggle 30, but smaller than an inner diameter of the inner surface 302 at a front end of the clutch toggle 30. A front end of the buffer ring 5 has a plurality of spring positioning recesses 51 for receiving another ends of the springs 6.

With reference to FIG. 2, the buffer ring 5 is movable at an outer portion of the clutch toggle 30 and is telescopically moved with respect to the buffer spring sleeve 4.

Because the buffer ring 5 is telescopically moved with respect to the buffer spring sleeve 4, the movement of the driving fork 3 will drive the clutch sleeve 20 of the second spindle 2 to engage the surface 10 of the first spindle 1 through the actions of the clutch toggle 30, the buffer spring sleeve 4 and the buffer ring 5. If the surface 201 of the clutch toggle 30 of the second spindle 2 is not aligned to the surface 10 of the first spindle 1. The resisting force in the alignment and the pushing force of the driving fork 3 will be absorbed by the compression of the spring 6 between the buffer spring sleeve 4 and the buffer ring 5. Thereby in the engagement of the surface 201 of the clutch toggle 30 of the second spindle 2 and the surface 10 of the first spindle 1, the two surfaces 201, 10 will be aligned and engaged so as to protect the parts of the clutch mechanism.

In application of the present invention, the clutch sleeve 20 and the buffer spring sleeve 4 can be connected as a single element or the clutch toggle 30 and the buffer ring 5 are connected as a single element, or the clutch sleeve 20 and the buffer spring sleeve 4 are connected as a single element and the clutch toggle 30 and the buffer ring 5 are connected as a single element. Thereby more than one element can be connected as a single element which can present the action and function of the original elements.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A clutch device with a buffer function comprising:
a first spindle having an engaging surface;
a second spindle having a rack at a side near the first spindle; the second spindle movably engaged to the first spindle; a clutch sleeve enclosing the second spindle; a front side of the clutch sleeve formed with an engaging surface near the first spindle; an axial hole of the clutch sleeve being formed as a teethed groove which can be positioned by engagement and is axially moved; the clutch sleeve being driven by a clutch toggle; the clutch toggle being controllable through a driving fork;.
a buffer unit installed between the clutch toggle and the clutch sleeve; thereby the movement of the clutch toggle will drive the clutch sleeve to move.

2. The clutch device with a buffer function as claimed in claim 1, wherein the buffer unit includes a buffer spring sleeve and a buffer ring.

3. The clutch device with a buffer function as claimed in claim 1, wherein a buffer spring sleeve and a buffer ring enclose the clutch sleeve.

4. The clutch device with a buffer function as claimed in claim 3, wherein a spring is installed between the buffer spring sleeve and the buffer ring.

5. The clutch device with a buffer function as claimed in claim 3, wherein the buffer spring sleeve is positioned at an outer side of the clutch sleeve and the buffer ring is positioned and movable on the outer side of the clutch sleeve; and the buffer ring telescopically moves with respect to the buffer spring sleeve.

6. The clutch device with a buffer function as claimed in claim 1, wherein a driving block drives the driving fork; the driving block has at least one penetrating hole for installing shaft which serves to position the driving block; and the driving block has a penetrating screw hole for driving a screw rod which serves to drive the driving block.

7. The clutch device with a buffer function as claimed in claim 1, wherein the clutch toggle is installed at an outer side of the buffer unit.

8. The clutch device with a buffer function as claimed in claim 1, wherein an outer side of the clutch toggle has an annular recess for assembling the driving fork; an inner side of the clutch toggle is formed as a stepped surface with two different diameters; and an inner diameter of a front inner surface is great than that of the rear inner surface.

9. The clutch device with a buffer function as claimed in claim 2, wherein the buffer spring sleeve is firmly secured at an outer side of the clutch sleeve; a C ring is embedded into an outer side of the clutch sleeve for fixing the buffer spring sleeve at the outer side of the clutch sleeve.

10. The clutch device with a buffer function as claimed in claim 2, wherein the buffer spring sleeve has an opening; the buffer ring is axially moveable in the opening; and a front end of the buffer spring sleeve has a plurality of spring positioning recess for receiving one ends of a plurality of springs.

11. The clutch device with a buffer function as claimed in claim 2, wherein a front end of the buffer spring sleeve has a plurality of spring positioning recess for receiving one ends of a plurality of springs.

12. The clutch device with a buffer function as claimed in claim 1, wherein a front end of the buffer ring has a pushing wall at an outer side of the buffer ring; and an outer diameter of the pushing wall is slightly greater than an inner diameter of an inner surface at a rear end of the clutch toggle, but smaller than an inner diameter of the inner surface at a front end of the clutch toggle.

13. The clutch device with a buffer function as claimed in claim 1, wherein a front end of the buffer ring has a plurality of spring positioning recesses for receiving another ends of the springs.

* * * * *